(12) United States Patent
Okumura et al.

(10) Patent No.: US 11,352,489 B2
(45) Date of Patent: Jun. 7, 2022

(54) THERMOPLASTIC ACRYLIC RESIN AND METHOD FOR PRODUCING SAME, AND RESIN COMPOSITION

(71) Applicant: KANEKA CORPORATION, Osaka (JP)

(72) Inventors: Sota Okumura, Hyogo (JP); Yusuke Hirai, Hyogo (JP); Takamasa Soejima, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 17/033,241

(22) Filed: Sep. 25, 2020

(65) Prior Publication Data

US 2021/0009802 A1 Jan. 14, 2021

Related U.S. Application Data

(63) Continuation of application No. PCT/JP2018/046834, filed on Dec. 19, 2018.

(30) Foreign Application Priority Data

Mar. 26, 2018 (JP) .............................. JP2018-058250
Sep. 18, 2018 (JP) .............................. JP2018-173453

(51) Int. Cl.
| | | |
|---|---|---|
| C08F 214/06 | (2006.01) | |
| C08F 220/44 | (2006.01) | |
| C08F 265/06 | (2006.01) | |
| C08K 5/1575 | (2006.01) | |
| C08K 5/42 | (2006.01) | |
| C08L 51/00 | (2006.01) | |

(52) U.S. Cl.
CPC .......... *C08L 51/003* (2013.01); *C08F 214/06* (2013.01); *C08F 220/44* (2013.01); *C08F 265/06* (2013.01); *C08K 5/1575* (2013.01); *C08K 5/42* (2013.01); *C08L 2201/08* (2013.01); *C08L 2203/12* (2013.01)

(58) Field of Classification Search
CPC ............... C08L 51/003; C08L 2201/08; C08L 2203/12; C08F 214/06; C08F 220/44; C08F 265/06; C08K 5/1575; C08K 5/42
USPC ........................................................ 524/504
See application file for complete search history.

(56) References Cited

U.S. PATENT DOCUMENTS

| | | | | |
|---|---|---|---|---|
| 2010/0216954 A1* | 8/2010 | Nakagawa | ................ | C08F 8/14 526/90 |
| 2018/0016416 A1 | 1/2018 | Fujita et al. | | |
| 2019/0002617 A1 | 1/2019 | Kotani | | |
| 2019/0300675 A1 | 10/2019 | Fujita et al. | | |

FOREIGN PATENT DOCUMENTS

| | | | |
|---|---|---|---|
| EP | 1865009 A1 | | 12/2007 |
| JP | 2005060466 A | * | 3/2005 |
| JP | 2005060466 A | | 3/2005 |
| JP | 2006299240 A | | 11/2006 |
| JP | 2010077361 A | * | 4/2010 |
| JP | 2010077361 A | | 4/2010 |
| JP | 2010241991 A | * | 10/2010 |
| JP | 2010241991 A | | 10/2010 |
| WO | 2006106899 A1 | | 10/2006 |
| WO | 2016158774 A1 | | 10/2016 |
| WO | 2017/154660 A1 | | 9/2017 |

OTHER PUBLICATIONS

International Search Report issued in International Application No. PCT/JP2018/046834, dated Apr. 2, 2019 (2 pages).
Written Opinion issued in International Application No. PCT/JP2018/046834, dated Apr. 2, 2019 (5 pages).
Extended European Search Report issued in corresponding European Application No. 18912505.7, dated Nov. 25, 2021 (7 pages).

* cited by examiner

*Primary Examiner* — Kelechi C Egwim
(74) *Attorney, Agent, or Firm* — Osha Bergman Watanabe & Burton LLP

(57) ABSTRACT

A thermoplastic acrylic resin is provided. The thermoplastic acrylic resin is a graft copolymer in which a stem polymer is an acrylic resin containing acrylonitrile and another ethylenically unsaturated monomer, and a branch polymer is a polymer composed of an ethylenically unsaturated monomer. The acrylonitrile is contained in an amount of 35 mass % or more and 84.5 mass % or less, the other ethylenically unsaturated monomer is contained in an amount of 15 mass % or more and 64.5 mass % or less, and the polymer composed of an ethylenically unsaturated monomer is contained in an amount of 0.5 mass % or more and 40 mass % or less. Thus, provided are a thermoplastic acrylic resin having improved melt-processability without compromising heat resistance, a method for producing the thermoplastic acrylic resin, a thermoplastic acrylic resin composition, a molded body, an acrylic fiber, and a method for producing the acrylic fiber.

14 Claims, No Drawings

THERMOPLASTIC ACRYLIC RESIN AND METHOD FOR PRODUCING SAME, AND RESIN COMPOSITION

TECHNICAL FIELD

One or more embodiment of the present invention relates to a melt-processable thermoplastic acrylic resin, a method for producing the same, and a resin composition.

BACKGROUND

An acrylic resin containing acrylonitrile as a polymerization component has excellent moldability and is used to produce molded bodies for various uses, such as plates and fibers. For example, acrylic fibers made of acrylic resins obtained by copolymerizing acrylonitrile with a vinyl halide and/or a vinylidene halide have been used for various products such as artificial hairs, flame-retardant materials, and pile fabrics. Acrylic resins obtained by copolymerizing acrylonitrile with a vinyl halide and/or a vinylidene halide have a decomposition starting temperature below their softening temperature, and will decompose if melt-processed. Usually, therefore, they are made into fibers using a wet spinning method. However, in the case of the wet spinning method, the drainage load is high, and the cost of solvent recovery is high. To address this issue, Patent Document 1 discusses melt-spinning of an acrylic fiber.

PATENT DOCUMENTS

Patent Document 1: WO 2016/158774

According to Patent Document 1, melt-spinning is made possible by reducing the melt-processing temperature by adding a plasticizer to an acrylic resin. However, depending on the amount of plasticizer added, the glass transition temperature may be significantly reduced, resulting in degradation in heat resistance of the acrylic fiber.

One or more embodiments of the present invention provides a thermoplastic acrylic resin having improved melt-processability without compromising heat resistance, a method for producing the thermoplastic acrylic resin, a thermoplastic acrylic resin composition, a molded body, an acrylic fiber, and a method for producing the acrylic fiber.

SUMMARY

One or more embodiments of the present invention relate to a thermoplastic acrylic resin that is a graft copolymer in which a stem polymer is an acrylic resin containing acrylonitrile and another ethylenically unsaturated monomer, and a branch polymer is a polymer composed of an ethylenically unsaturated monomer, wherein thermoplastic acrylic resin contains acrylonitrile in an amount of 35 mass % or more and 84.5 mass % or less, the another ethylenically unsaturated monomer in an amount of 15 mass % or more and 64.5 mass % or less, and the polymer composed of the ethylenically unsaturated monomer in an amount of 0.5 mass % or more and 40 mass % or less.

In one or more embodiments of the present invention, it is preferable that the thermoplastic acrylic resin is a copolymer obtained by copolymerizing the acrylonitrile, the another ethylenically unsaturated monomer, and a macromonomer having, as its main chain, the polymer composed of the ethylenically unsaturated monomer, wherein the ethylenically unsaturated monomer contains a double bond, and when a total mass of the acrylonitrile, the another ethylenically unsaturated monomer, and the macromonomer having the polymer composed of the ethylenically unsaturated monomer containing the double bond as the main chain is taken as 100 parts by mass, the acrylonitrile is contained in an amount of 35 parts by mass or more and 84.5 parts by mass or less, the another ethylenically unsaturated monomer is contained in an amount of 15 parts by mass or more and 64.5 parts by mass or less, and the macromonomer having the polymer composed of the ethylenically unsaturated monomer containing the double bond as the main chain is contained in an amount of 0.5 parts by mass or more and 40 parts by mass or less.

In the thermoplastic acrylic resin according to one or more embodiments of the present invention, it is preferable that the another ethylenically unsaturated monomer is one or more ethylenically unsaturated monomers selected from the group consisting of a vinyl halide and a vinylidene halide.

In one or more embodiments of the present invention, it is preferable that the thermoplastic acrylic resin contains the polymer composed of the ethylenically unsaturated monomer in an amount of 1 mass % or more and 30 mass % or less.

In one or more embodiments of the present invention, it is preferable that primary particles of the thermoplastic acrylic resin have an average particle diameter of 10 μm or more and 1000 μm or less.

In one or more embodiments of the present invention, it is preferable that the macromonomer having the polymer composed of ethylenically unsaturated monomer containing a double bond as the main chain has at least one reactive functional group per single molecule at an end of the single molecule, the reactive functional group having a polymerizable carbon-carbon double bond represented by a general formula (1) below:

$$CH_2=C(R)-C(O)O- \quad (1)$$

where R represents hydrogen or an organic group having 1 to 20 carbon atoms.

In one or more embodiments of the present invention, it is preferable that the polymer composed of the ethylenically unsaturated monomer contains one or more monomers selected from the group consisting of a (meth)acrylic ester-based monomer, a styrene-based monomer, a nitrile group-containing vinyl monomer, and an amide group-containing vinyl monomer.

In one or more embodiments of the present invention, it is preferable that the polymer composed of the ethylenically unsaturated monomer contains a (meth)acrylic ester monomer in an amount of 50 mass % or more, the (meth)acrylic ester monomer having a heteroatom in its ester moiety.

Moreover, one or more embodiments of the present invention relate to a method for producing the thermoplastic acrylic resin, the method including copolymerizing a total of 100 parts by mass of a monomer mixture using a suspension polymerization method or a fine suspension polymerization method, the monomer mixture containing the acrylonitrile in an amount of 35 parts by mass or more and 84.5 parts by mass or less, the another ethylenically unsaturated monomer in an amount of 15 parts by mass or more and 64.5 parts by mass or less, and a macromonomer having, as its main chain, the polymer composed of the ethylenically unsaturated monomer containing the double bond in an amount of 0.5 parts by mass or more and 40 parts by mass or less.

In the thermoplastic acrylic resin producing method according to one or more embodiments of the present invention, it is preferable that the another ethylenically unsaturated monomer is one or more ethylenically unsaturated monomers selected from the group consisting of a vinyl halide and a vinylidene halide.

Moreover, one or more embodiments of the present invention relate to a thermoplastic acrylic resin composition containing the thermoplastic acrylic resin and a plasticizer, wherein the plasticizer is an organic compound that has a boiling point of 200° C. or above.

In one or more embodiments of the present invention, it is preferable that the thermoplastic acrylic resin composition contains the plasticizer in an amount of 0.1 parts by mass or more and 50 parts by mass or less, with respect to 100 parts by mass of the thermoplastic acrylic resin.

In one or more embodiments of the present invention, it is preferable that the plasticizer is at least one selected from the group consisting of dimethyl sulfone, diethyl sulfone, dipropyl sulfone, dibutyl sulfone, diphenyl sulfone, vinyl sulfone, ethyl methyl sulfone, methyl phenyl sulfone, methyl vinyl sulfone, 3-methyl sulfolane, dipropyl sulfoxide, tetramethylene sulfoxide, diisopropyl sulfoxide, methyl phenyl sulfoxide, dibutyl sulfoxide, diisobutyl sulfoxide, di-p-tolyl sulfoxide, diphenyl sulfoxide, benzyl sulfoxide, lactide, pyrrolidone, N-methyl pyrrolidone, ε-caprolactam, N-methylcaprolactam, γ-butyrolactone, γ-hexalactone, γ-heptalactone, γ-octalactone, ε-caprolactone, and ε-octalactone. In one or more embodiments of the present invention, it is preferable that the plasticizer is at least one selected from the group consisting of dimethyl sulfone and lactide.

In one or more embodiments of the present invention, it is preferable that the thermoplastic acrylic resin composition further contains at least one stabilizer selected from the group consisting of an epoxy-based heat stabilizer, a hydrotalcite-based heat stabilizer, a tin-based heat stabilizer, a Ca—Zn-based heat stabilizer, and a β-diketone-based heat stabilizer.

In one or more embodiments of the present invention, it is preferable that the thermoplastic acrylic resin composition contains the stabilizer in an amount of 0.1 parts by mass or more and 30 parts by mass or less, with respect to 100 parts by mass of the thermoplastic acrylic resin.

In one or more embodiments of the present invention, it is preferable that the stabilizer is at least one selected from the group consisting of polyglycidyl methacrylate, tetrabromobisphenol A diglycidyl ether, hydrotalcite, zinc 12-hydroxystearate, calcium 12-hydroxystearate, stearoyl benzoyl methane (SBM), and dibenzoyl methane (DBM).

One or more embodiments of the present invention relate to a molded body made of the thermoplastic acrylic resin composition.

One or more embodiments of the present invention relate to an acrylic fiber made of the thermoplastic acrylic resin composition.

One or more embodiments of the present invention relate to a method for producing an acrylic fiber, including obtaining an acrylic fiber by melt-spinning the thermoplastic acrylic resin composition.

According to one or more embodiments of the present invention, it is possible to provide a thermoplastic acrylic resin having improved melt-processability without compromising heat resistance, a thermoplastic acrylic resin composition containing the thermoplastic acrylic resin, as well as a molded body and a fiber made of the thermoplastic acrylic resin composition. Moreover, with the production method of one or more embodiments of the present invention, a thermoplastic acrylic resin having improved melt-processability can be obtained without compromising heat resistance, by copolymerizing a macromonomer with an acrylic resin containing acrylonitrile with a good yield.

Furthermore, according to one or more embodiments of the present invention, it is possible to produce an acrylic fiber using a melt-spinning method.

DETAILED DESCRIPTION

The inventors of the present invention conducted numerous studies to improve the melt-processability of an acrylic resin containing acrylonitrile and another ethylenically unsaturated monomer without compromising the heat resistance of the acrylic resin. As a result, they found that, when a graft polymer is used in which a stem polymer is an acrylic resin containing acrylonitrile and another ethylenically unsaturated monomer, a branch polymer is a polymer composed of an ethylenically unsaturated monomer, and the amounts of acrylonitrile, the other ethylenically unsaturated monomer, and the polymer composed of an ethylenically unsaturated monomer are within predetermined ranges, melt-processability can be improved without compromising heat resistance.

In one or more embodiments of the present invention, the thermoplastic acrylic resin is a graft copolymer in which a stem polymer is an acrylic resin containing acrylonitrile and another ethylenically unsaturated monomer, and a branch polymer is a polymer composed of an ethylenically unsaturated monomer. In the present application, whether a polymer is a "graft copolymer" can be checked based on the value of the degree of branching (gM=(the square of the average radius of gyration of a branched polymer/the square of the average radius of gyration of a straight-chain polymer)) measured and calculated using a gel permeation chromatography multi angle light scattering photometer (GPC-MALS). Specifically, when the value of the degree of branching (gM) of a polymer is within a range of 0.20 or more and 0.95 or less, this means that the polymer is a graft copolymer.

In one or more embodiments of the present invention, the thermoplastic acrylic resin contains acrylonitrile in an amount of 35 mass % or more and 84.5 mass % or less, the other ethylenically unsaturated monomer in an amount of 15 mass % or more and 64.5 mass % or less, and the polymer composed of an ethylenically unsaturated monomer in an amount of 0.5 mass % or more and 40 mass % or less. When the thermoplastic acrylic resin contains acrylonitrile in an amount of 35 mass % or more, the thermoplastic acrylic resin has favorable heat resistance. When the thermoplastic acrylic resin contains the polymer composed of an ethylenically unsaturated monomer in an amount of 0.5 mass % or more, melt-processability of the thermoplastic acrylic resin can be improved. Moreover, when the amount of the polymer composed of an ethylenically unsaturated monomer is 40 mass % or less, polymerization stability of the graft copolymer in which the stem polymer is the acrylic resin containing acrylonitrile and the other ethylenically unsaturated monomer and the branch polymer is the polymer composed of an ethylenically unsaturated monomer can be improved. From the viewpoint of melt-processability and polymerization stability, it is preferable that the thermoplastic acrylic resin contains the polymer composed of an ethylenically unsaturated monomer in an amount of 1 mass % or more and 30 mass % or less.

In one or more embodiments of the present invention, it is preferable that the thermoplastic acrylic resin is a copolymer obtained by copolymerizing acrylonitrile, another ethylenically unsaturated monomer, and a macromonomer having, as its main chain, a polymer composed of an ethylenically unsaturated monomer containing a double bond, and when the total mass of acrylonitrile, the other ethylenically unsaturated monomer, and the macromonomer having the polymer composed of an ethylenically unsaturated monomer as the main chain is taken as 100 parts by mass, the amount of acrylonitrile is 35 parts by mass or more and 84.5 parts by mass or less, the amount of the other ethylenically unsaturated monomer is 15 parts by mass or more and 64.5 parts by mass or less, and the amount of the macromonomer having the polymer composed of an ethylenically unsaturated monomer containing a double bond as the main chain is 0.5 parts by mass or more and 40 parts by mass or less. That is to say, it is preferable to obtain the thermoplastic acrylic resin by copolymerizing a total of 100 parts by mass of monomer mixture containing acrylonitrile in an amount of 35 parts by mass or more and 84.5 parts by mass or less, the other ethylenically unsaturated monomer in an amount of 15 parts by mass or more and 64.5 parts by mass or less, and the macromonomer having the polymer composed of an ethylenically unsaturated monomer containing a double bond as the main chain in an amount of 0.5 parts by mass or more and 40 parts by mass or less.

There is no particular limitation on the other ethylenically unsaturated monomer, and it is sufficient that the other ethylenically unsaturated monomer is an ethylenically unsaturated monomer other than acrylonitrile. Examples include a vinyl halide, a vinylidene halide, a styrene-based monomer, a (meth)acrylic ester-based monomer, and a vinyl ester-based monomer. As the styrene-based monomer, the (meth)acrylic ester-based monomer, or the vinyl ester-based monomer, monomers that will be described later can be used as appropriate. From the viewpoint of heat resistance and flame retardancy, it is preferable to use one or more ethylenically unsaturated monomers selected from the group consisting of a vinyl halide and a vinylidene halide, as the other ethylenically unsaturated monomer.

It is preferable that, from the viewpoint of melt-processability, heat resistance, and flame retardancy, the thermoplastic acrylic resin is a copolymer obtained by copolymerizing acrylonitrile, one or more ethylenically unsaturated monomers selected from the group consisting of a vinyl halide and a vinylidene halide, and a macromonomer having, as its main chain, a polymer composed of an ethylenically unsaturated monomer containing a double bond, and when the total mass of acrylonitrile, the one or more ethylenically unsaturated monomers selected from the group consisting of a vinyl halide and a vinylidene halide, and the macromonomer having the polymer composed of an ethylenically unsaturated monomer containing a double bond as the main chain is taken as 100 parts by mass, the amount of acrylonitrile is 35 parts by mass or more and 84.5 parts by mass or less, the amount of the one or more ethylenically unsaturated monomers selected from the group consisting of a vinyl halide and a vinylidene halide is 15 parts by mass or more and 64.5 parts by mass or less, and the amount of the macromonomer having the polymer composed of an ethylenically unsaturated monomer containing a double bond as the main chain is 0.5 parts by mass or more and 40 parts by mass or less. It is more preferable that the amount of acrylonitrile is 35 parts by mass or more and 64 parts by mass or less, the amount of the one or more ethylenically unsaturated monomers selected from the group consisting of a vinyl halide and a vinylidene halide is 35 parts by mass or more and 64 parts by mass or less, and the amount of the macromonomer having the polymer composed of an ethylenically unsaturated monomer containing a double bond as the main chain is 1 parts by mass or more and 30 parts by mass or less.

That is to say, the thermoplastic acrylic resin is preferably obtained by copolymerizing a total of 100 parts by mass of monomer mixture containing acrylonitrile in an amount of 35 parts by mass or more and 84.5 parts by mass or less, one or more ethylenically unsaturated monomers selected from the group consisting of a vinyl halide and a vinylidene halide in an amount of 15 parts by mass or more and 64.5 parts by mass or less, and a macromonomer having a polymer composed of an ethylenically unsaturated monomer containing a double bond as the main chain in an amount of 0.5 parts by mass or more and 40 parts by mass or less, and is more preferably obtained by copolymerizing a total of 100 parts by mass of monomer mixture containing acrylonitrile in an amount of 35 parts by mass or more and 64 parts by mass or less, one or more ethylenically unsaturated monomers selected from the group consisting of a vinyl halide and a vinylidene halide in an amount of 35 parts by mass or more and 64 parts by mass or less, and a macromonomer having a polymer composed of an ethylenically unsaturated monomer containing a double bond as the main chain in an amount of 1 parts by mass or more and 30 parts by mass or less.

There is no particular limitation on the vinyl halide, and examples include vinyl chloride, vinyl bromide, and vinyl iodide. These halides can be used alone or in a combination of two or more. From the viewpoint of heat resistance, it is preferable to use vinyl chloride and/or vinylidene chloride, and it is more preferable to use vinyl chloride.

In general, a macromonomer means an oligomer molecule with a reactive functional group at an end of the polymer. The macromonomer having a polymer composed of an ethylenically unsaturated monomer containing a double bond as the main chain (hereinafter also referred to simply as the "macromonomer") used in one or more embodiments of the present invention has a group having a polymerizable carbon-carbon double bond selected from the group consisting of an allyl group, a vinylsilyl group, a vinyl ether group, a dicyclopentadienyl group, and a group having a polymerizable carbon-carbon double bond represented by the general formula (1) below, as the reactive functional group (also referred to as the "polymerizable functional group"), and the macromonomer has at least one such reactive functional group per single molecule at an end of the molecule. Usually, the macromonomer can be produced by radical polymerization. In particular, in light of favorable reactivity with acrylonitrile and a vinyl chloride-based monomer, it is preferable that the reactive functional group in the macromonomer has a polymerizable carbon-carbon double bond represented by the general formula (1) below:

$$CH_2=C(R)-C(O)O- \qquad (1)$$

where R represents hydrogen or an organic group having 1 to 20 carbon atoms. There is no particular limitation on specific examples of R For example, it is preferable to use a group selected from the group consisting of —H, —CH$_3$, —CH$_2$CH$_3$, —(CH$_2$)$_n$CH$_3$ (n represents an integer of 2 to 19), —C$_6$H$_5$, —CH$_2$OH, and —CN, and it is more preferable to use a group selected from the group consisting of —H and —CH$_3$.

There is no particular limitation on the method for producing the polymer composed of an ethylenically unsaturated monomer having a double bond, which serves as the main chain of the macromonomer used in one or more embodiments of the present invention, and a conventionally known production method can be used. For example, JP 2006-299240A provides a detailed description of methods for producing a macromonomer used in one or more embodiments of the present invention, and any of these production methods may be used. Usually, however, a controlled radical polymerization method is used. Furthermore, in terms of the ease of control and the like, a living radical polymerization method is preferably used, and an atom transfer radical polymerization method is particularly preferable.

There is no particular restriction on the polymer composed of an ethylenically unsaturated monomer of the main chain of the macromonomer. As the ethylenically unsaturated monomer constituting the polymer, various types of ethylenically unsaturated monomers can be used. Examples thereof include a (meth)acrylic ester-based monomer, a styrene-based monomer, a vinyl-based monomer containing a nitrile group, a vinyl-based monomer containing an amide group, a fluorine-containing vinyl monomer, a silicon-containing vinyl monomer, a maleimide-based monomer, vinyl esters, alkenes, and conjugated dienes. Moreover, maleic anhydride, maleic acid, and monoalkyl esters and dialkyl esters of maleic acid; fumaric acid and monoalkyl esters and dialkyl esters of fumaric acid; allyl chloride, allyl alcohol, and the like can also be used.

Examples of the (meth)acrylic ester-based monomer include (meth)acrylic esters of aliphatic hydrocarbons (e.g., alkyls having 1 to 18 carbon atoms), (meth)acrylic esters of alicyclic hydrocarbons, (meth)acrylic esters of aromatic hydrocarbons, and (meth)acrylic esters of aralkyls. Examples of the (meth)acrylic esters of aliphatic hydrocarbons include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, and stearyl (meth)acrylate. Examples of the (meth)acrylic esters of alicyclic hydrocarbons include cyclohexyl (meth)acrylate and isobornyl (meth)acrylate. Examples of the (meth)acrylic esters of aromatic hydrocarbons include phenyl (meth)acrylate and toluyl (meth)acrylate. Examples of the (meth) acrylic esters of aralkyls include benzyl (meth)acrylate.

As the (meth)acrylic ester-based monomer, for example, a (meth)acrylic ester-based monomer having a heteroatom in the ester moiety may also be used. The heteroatom is not particularly limited, and may be, for example, oxygen (O), fluorine (F), nitrogen (N), or the like. Specific examples of the (meth)acrylic ester-based monomer having a heteroatom in the ester moiety include 2-methoxyethyl (meth)acrylate, 3-methoxybutyl (meth)acrylate, 2-hydroxyethyl (meth)acrylate, 2-hydroxypropyl (meth)acrylate, glycidyl (meth)acrylate, 2-aminoethyl (meth)acrylate, γ-(methacryloyloxypropyl)trimethoxysilane, ethylene oxide adducts of (meth) acrylic acid, trifluoromethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth) acrylate, 2-perfluoromethyl-2-perfluoroethylmethyl (meth) acrylate, 2-perfluorohexylethyl (meth)acrylate, 2-perfluorodecylethyl (meth)acrylate, and 2-perfluorohexadecylethyl (meth)acrylate.

Examples of the styrene-based monomer include styrene, vinyltoluene, α-methylstyrene, chlorostyrene, and styrenesulfonic acid and salts thereof. Examples of the vinyl-based monomer containing a nitrile group include acrylonitrile and methacrylonitrile. Examples of the vinyl-based monomer containing an amide group include acrylamide and methacrylamide. Examples of the fluorine-containing vinyl monomer include perfluoroethylene, perfluoropyrene, and vinylidene fluoride. Examples of the silicon-containing vinyl monomer include vinyltrimethoxysilane and vinyltriethoxysilane Examples of the maleimide-based monomer include maleimide, methyl maleimide, ethyl maleimide, propyl maleimide, butyl maleimide, hexyl maleimide, octyl maleimide, dodecyl maleimide, stearyl maleimide, phenyl maleimide, and cyclohexyl maleimide. Examples of the vinyl esters include vinyl acetate, vinyl propionate, vinyl pivalate, vinyl benzoate, and vinyl cinnamate. Examples of the alkenes include ethylene and propylene. Examples of the conjugated dienes include butadiene and isoprene.

The above-listed ethylenically unsaturated monomers may be used alone, or two or more thereof may be copolymerized. In the present specification, the term "(meth)acrylic acid" means acrylic acid and/or methacrylic acid.

As the ethylenically unsaturated monomer, it is preferable to use one or more monomers selected from the group consisting of a (meth)acrylic ester-based monomer, a styrene-based monomer, a vinyl-based monomer containing a nitrile group, and a vinyl-based monomer containing an amide group, from the viewpoint of the properties and the like of the resulting product. It is more preferable to use one or more monomers selected from the group consisting of a (meth)acrylic ester-based monomer and a vinyl-based monomer containing a nitrile group, and it is even more preferable to use one or more monomers selected from the group consisting of an acrylic ester-based monomer and a vinyl-based monomer containing a nitrile group. From the viewpoint of the melt-processability, such as spinnability, and the properties and the like of the thermoplastic acrylic resin, it is particularly preferable to use a (meth)acrylic ester monomer having a heteroatom in the ester moiety as the ethylenically unsaturated monomer. In one or more embodiments of the present invention, copolymers of these preferable monomers with the above-listed other monomers may also be used. In that case, the preferable monomers are contained in an amount of preferably 40 mass % or more, and more preferably 50 mass % or more.

In one or more embodiments of the present invention, as the macromonomer, a macromonomer may be used alone, or two or more macromonomers may be used in combination.

There is no particular limitation on the number average molecular weight of the macromonomer having a polymer composed of an ethylenically unsaturated monomer containing a double bond as the main chain. However, the number average molecular weight of the macromonomer determined by GPC is within a range of preferably 1000 or more and 100000 or less, and more preferably 1000 or more and 40000 or less. From the viewpoint of enabling uniform mixing with a vinyl halide and/or a vinylidene halide and suppressing the amount of unreacted macromonomer that will remain after the end of polymerization to a small amount, the number average molecular weight is even more preferably within a range of 3000 or more and 30000 or less. From the viewpoint of obtaining a narrow molecular weight distribution, it is preferable that the ratio (Mw/Mn) of the mass average molecular weight Mw to the number average molecular weight Mn of the macromonomer having a polymer composed of an ethylenically unsaturated monomer containing a double bond as the main chain is 1.1 or more and 1.5 or less.

In one or more embodiments of the present invention, the acrylic resin containing acrylonitrile and another ethylenic unsaturated monomer is copolymerized with the macromonomer having a polymer composed of an ethylenically unsaturated monomer containing a double bond as the main chain. In an acrylic resin containing acrylonitrile, when acrylonitrile is copolymerized with a monomer capable of reducing the glass transition temperature of a vinyl-based polymer, the melt-processing temperature can be reduced, but there is a risk that heat resistance will be impaired because the glass transition temperature is reduced. In contrast, when the acrylic resin containing acrylonitrile and the other ethylenic unsaturated monomer is copolymerized with the macromonomer and formed into a graft polymer, a thermoplastic acrylic resin having a reduced melt-processing temperature can be obtained while maintaining the heat resistance without reducing the glass transition temperature of the acrylic resin.

As the method for producing a thermoplastic acrylic resin of one or more embodiments of the present invention, copolymerization in an aqueous medium is preferably used in light of the convenience in controlling the polymerization and the ease of separation and washing of polymer particles after the polymerization. Examples of the method for performing polymerization in an aqueous medium include production methods such as a suspension polymerization method, a fine suspension polymerization method, and an emulsion polymerization method. Among these, the suspension polymerization method or the fine suspension polymerization method is preferable from the viewpoint of polymerization stability. In order to obtain an acrylic resin with an average particle diameter of 1 μm or more and 1000 μm or less, it is more preferable to use the suspension polymerization method.

For example, if copolymerization with the macromonomer is performed using the emulsion polymerization method, there is a risk that the yield will be poor, because a macromonomer has a low solubility in water. If a large amount of unreacted macromonomer remains after the end of the polymerization, contamination of a polymerization can, and piping, due to the remaining macromonomer is likely to occur. Moreover, if a large amount of unreacted macromonomer is present during melt-kneading, the unreacted macromonomer functions as a lubricant against the acrylic resin, and there is a risk that kneading cannot be performed. For these reasons as well, it is preferable to produce the thermoplastic acrylic resin using the suspension polymerization method or the fine suspension polymerization method, which provides a good yield of the macromonomer.

An acrylic resin is commonly produced using the emulsion polymerization method. In this case, from the viewpoint of improving polymerization stability, as well as dyeability of a fiber that will be made of the acrylic resin, and spinnability in the case of the wet spinning method, a vinyl monomer having an ionic substituent is usually copolymerized. However, when producing an acrylic resin using the suspension polymerization method, the addition of a monomer having an ionic substituent may significantly impair the polymerization stability, that is, for example, minute particles may be generated, or scaling may be caused by polymerization. For this reason, when producing the thermoplastic acrylic resin using the suspension polymerization method or the fine suspension polymerization method, it is preferable to select the other ethylenically unsaturated monomer from only nonionic monomers. In the present specification, the term "nonionic monomers" means monomers with a degree of ionization in water of 1% or less over the entire pH range.

The thermoplastic acrylic resin can also be produced by copolymerizing acrylonitrile, the one or more ethylenically unsaturated monomers selected from the group consisting of a vinyl halide and a vinylidene halide, the macromonomer, which have been described above, and one or two or more other monomers as appropriate without impairing the effects of one or more embodiments of the present invention. The proportion of the other monomers to all the constitutional units constituting the thermoplastic acrylic resin is preferably 20 parts by mass or less with respect to 100 parts by mass of all the constitutional units, and is more preferably 15 parts by mass or less from the viewpoint of heat resistance.

With the suspension polymerization method or the fine suspension polymerization method, the above-described monomers, a suspending and dispersing agent, a polymerization initiator, a chain transfer agent, and the like can be fed collectively at one time, or in a divided manner or continuously, as necessary, and a copolymerization reaction can be conducted at a predetermined polymerization temperature, for example, at a temperature of 25° C. or more and 100° C. or less.

As the suspending and dispersing agent, any suspending and dispersing agents that do not compromise one or more embodiments of the present invention can be used without particular limitation. For example, organic polymeric dispersing agents, such as partially saponified polyvinyl acetate; water-soluble cellulose ethers such as methylcellulose, hydroxyethyl cellulose, hydroxypropyl cellulose, hydroxypropyl methylcellulose, and carboxymethyl cellulose; polyethylene oxide; polyvinyl pyrrolidone; polyacrylic acid; vinyl acetate-maleic acid copolymer; styrene-maleic acid copolymer; gelatin; and starch, can be used as the suspending and dispersing agent. These can be used alone or in a combination of two or more.

There is no particular limitation on the polymerization initiator, and any oil-soluble polymerization initiators that do not compromise one or more embodiments of the present invention can be added. However, among such initiators, initiators with a 10-hour half-life temperature of 30 to 65° C. are preferably used. Examples of these oil-soluble polymerization initiators include organic peroxide-based polymerization initiators, such as diisobutyl peroxide, cumyl peroxyneodecanoate, diisopropyl peroxydicarbonate, di(2-ethylhexyl)peroxydicarbonate, t-butyl peroxypivalate, t-butyl peroxyneodecanoate, 1,1,3,3-tetramethylbutyl peroxyneodecanoate, dilauroyl peroxide, and di(3,5,5-trimethylhexanoyl)peroxide; and azo-based polymerization initiators, such as 2,2'-azobisisobutylonitrile, 2, 2'-azobis(4-methoxy-2,4-dimethylvaleronitrile), and 2,2'-azobis-(2,4-dimethylvaleronitrile). These oil-soluble polymerization initiators may be used alone or in a combination of two or more. These oil-soluble polymerization initiators can be added without any particular restriction. However, if they are used dissolved in, for example, an organic solvent, examples of the organic solvent include aromatic hydrocarbons, such as toluene, xylene, and benzene; aliphatic hydrocarbons, such as hexane and isoparaffin; ketones, such as acetone and methyl ethyl ketone; and esters, such as ethyl acetate, butyl acetate, and dioctyl phthalate. These organic solvents may be used alone or in a combination of two or more.

There is no particular limitation on the chain transfer agent, and any chain transfer agents that do not compromise one or more embodiments of the present invention can be used. Preferred examples of such chain transfer agents include alkyl mercaptans having 2 to 12 carbon atoms in their main chain, and mercapto alcohols. Examples of the alkyl mercaptans having 2 to 12 carbon atoms in their main chain include n-octyl mercaptan (also referred to as "1-octanethiol"), t-octyl mercaptan, n-dodecyl mercaptan, t-dodecyl mercaptan, and 2-ethylhexyl thioglycol. Examples of the mercapto alcohols include 2-mercaptoethanol.

In the suspension polymerization method or the fine suspension polymerization method, as long as one or more embodiments of the present invention are not compromised, a surfactant, a dispersion aid, an antioxidant, a polymerization degree regulator, a particle diameter regulator, a pH regulator, a gelling properties improver, a antistatic agent, a stabilizer, an anti-scaling agent, and the like can be used as appropriate, when necessary.

With the suspension polymerization or the fine suspension polymerization, the thermoplastic acrylic resin is obtained in the form of a latex or a slurry. There is no particular restriction on the method for drying the latex or the slurry to obtain a copolymer resin in powder or granular form. For example, a method in which the latex or the slurry is dehydrated and then dried using a stationary drying method in a hot air dryer or the like can be employed.

Primary particles of the thermoplastic acrylic resin usually have an average particle diameter of 1 μm or more and 1000 μm or less, and from the viewpoint of powder transport and filterability, the average particle diameter is preferably 10 μm or more and 1000 μm or less, and more preferably 50 μm or more and 500 μm or less. In the present specification, the term "average particle diameter of primary particles" refers to the diameter of primary particles of a resin obtained by simply dehydrating the resin obtained by suspension polymerization or fine suspension polymerization, that is, a resin that is not granulated by heat treatment or the like, and means the particle diameter D50 at a cumulative percentage by volume of 50 vol % in a volume-based particle size distribution measured using a laser diffraction/scattering particle diameter distribution analyzer "Partica LA-950 V2" manufactured by HORIBA Ltd.

The mass average molecular weight of the thermoplastic acrylic resin measured using a GPC method is preferably 10000 or more and 300000 or less. From the viewpoint of melt fluidity during molding processing, the mass average molecular weight is more preferably 30000 or more and 150000 or less.

In one or more embodiments of the present invention, a plasticizer that is an organic compound being compatible with the thermoplastic acrylic resin and having a boiling point of 200° C. or above (hereinafter also referred to simply as the "plasticizer for acrylic resin") may be added to the thermoplastic acrylic resin to obtain a thermoplastic acrylic resin composition. In the present specification, the term "compatible" means that, when 10 mg of thermoplastic acrylic resin and 2 g of organic compound having a boiling point of 200° C. or above are placed in a 19-mL glass tube made of borosilicate glass, a silicone stopper is put in the glass tube, and heating is performed at 160° C. for 30 minutes under occasional stirring, the thermoplastic acrylic resin can be dissolved. Moreover, in the present specification, the term "boiling point" means a normal boiling point under conditions of one atmospheric pressure (760 mmHg).

There is no particular limitation on the plasticizer for acrylic resin, and any organic compounds that are compatible with the acrylic resin and have a boiling point of 200° C. or above can be used. For example, sulfone-based compounds, such as dimethyl sulfone, diethyl sulfone, dipropyl sulfone, dibutyl sulfone, diphenyl sulfone, vinyl sulfone, ethyl methyl sulfone, methyl phenyl sulfone, methyl vinyl sulfone, and 3-methyl sulfolane; sulfoxide-based compounds, such as dipropyl sulfoxide, tetramethylene sulfoxide, diisopropyl sulfoxide, methyl phenyl sulfoxide, dibutyl sulfoxide, diisobutyl sulfoxide, di-p-tolyl sulfoxide, diphenyl sulfoxide, and benzyl sulfoxide; lactides, such as lactide; lactams, such as pyrrolidone, N-vinylpyrrolidone, ε-caprolactam, and N-methylcaprolactam; lactones, such as γ-butyrolactone, γ-hexalactone, γ-heptalactone, γ-octalactone, ε-caprolactone, and ε-octalactone; and the like can be used. Moreover, these plasticizers for acrylic resin may be used alone or in a combination of two or more.

Regarding the plasticizer for acrylic resin, when a fiber is kept at a temperature above the melting point of the plasticizer, the plasticizer may become liquid and ooze out onto the fiber surface. This causes degradation in the appearance and the tactile feel of the fiber and increases the likelihood of a problem in that, as the temperature returns to room temperature (25±5° C.) thereafter, the plasticizer becomes solid and conglutinates the fiber. In particular, during overseas shipping, the temperature in a container on a ship may rise to as high as 60° C. Also, during fiber processing, the temperature may reach as high as 90° C. even only for a short period of time. For this reason, the melting point of the plasticizer for acrylic resin is preferably 60° C. or above, and more preferably 90° C. or above. For example, it is preferable to use one or more compounds selected from the group consisting of dimethyl sulfone, lactide, and ε-caprolactam, or the like, and it is more preferable to use one or more compounds selected from the group consisting of dimethyl sulfone and lactide, or the like.

From the viewpoint of melt-processability, the thermoplastic acrylic resin composition preferably contains the plasticizer for acrylic resin in an amount of 0.1 parts by mass or more and 50 parts by mass or less, with respect to 100 parts by mass of the thermoplastic acrylic resin. When the amount of the plasticizer for acrylic resin is 50 parts by mass or less, favorable melt-processability is obtained, and also the resin viscosity during melt-kneading is improved, and therefore, the kneading efficiency tends to improve. From the viewpoint of heat resistance, the plasticizer for acrylic resin is contained in an amount of preferably 30 parts by mass or less, more preferably 25 parts by mass or less, even more preferably 20 parts by mass or less, and particularly preferably 15 parts by mass or less, with respect to 100 parts by mass of the thermoplastic acrylic resin. From the viewpoint of melt-processability, the thermoplastic acrylic resin composition contains the plasticizer for acrylic resin in an amount of preferably 0.5 parts by mass or more, more preferably 1 part by mass or more, and even more preferably 5 parts by mass or more, with respect to 100 parts by mass of the thermoplastic acrylic resin. For example, in the case where dimethyl sulfone is used, when the amount of dimethyl sulfone is 5 parts by mass or more, favorable melt-processability is obtained, and when dimethyl sulfone is mixed in an amount of 20 parts by mass, melt-processing can be performed even at a low temperature, for example, at 115° C., which is 5° C. above the melting point of dimethyl sulfone.

The thermoplastic acrylic resin composition may further contain a stabilizer so as to have heat stability. There is no particular limitation on the stabilizer, and any stabilizers that impart heat stability can be used. From the viewpoint of suppressing coloration and securing transparency while improving melt-processability, it is preferable to use at least one stabilizer selected from the group consisting of an epoxy-based heat stabilizer, a hydrotalcite-based heat stabilizer, a tin-based heat stabilizer, a Ca—Zn-based heat stabilizer, and a β-diketone-based heat stabilizer as the stabilizer.

As the epoxy-based heat stabilizer, one or more compounds selected from the group consisting of butylglycidyl ether, neopentyl glycol diglycidyl ether, phenyl glycidyl ether, orthocresyl glycidyl ether, metaparacresyl glycidyl ether, glycidyl methacrylate, 1,6-hexanediol diglycidyl ether, trimethylolpropane polyglycidyl ether, tetrabromobisphenol A diglycidyl ether, hexahydrophthalic acid diglycidyl ester, hydrogenated bisphenol A diglycidyl ether, propylene glycol diglycidyl ether, tripropylene glycol diglycidyl ether, polypropylene glycol diglycidyl ether, fatty acid modified epoxy, diethylene glycol diglycidyl ether, polyethylene glycol diglycidyl ether, glycerol polyglycidyl ether, diglycerol polyglycidyl ether, polyglycerol polyglycidyl ether, sorbitol-based polyglycidyl ether, 1,3,5-tris(2,3-epoxypropyl)-1,3,5-triazine, tetrahydrophthalic acid diglycidyl ester, and glycidyl acrylate; homopolymers or copolymers of these compounds; and the like can be used. Among these, from the viewpoint of suppressing coloration and securing transparency, it is preferable to use polyglycidyl methacrylate (homopolymer of glycidyl methacrylate), a copolymer of glycidyl methacrylate, tetrabromobisphenol A diglycidyl ether, hexahydrophthalic acid diglycidyl ester, hydrogenated bisphenol A diglycidyl ether, and the like, and it is more preferable to use polyglycidyl methacrylate, a copolymer of glycidyl methacrylate, tetrabromobisphenol A diglycidyl ether, and the like, that have a boiling point of 200° C. or above and are in solid form at 50° C.

There is no particular limitation on the hydrotalcite-based heat stabilizer, and any hydrotalcite compounds can be used. The hydrotalcite-based heat stabilizer may be a naturally product or a synthetic product. For example, ALCAMIZER (registered trademark) manufactured by Kyowa Chemical Industry Co., Ltd., and the like can be used.

There is no particular limitation on the tin-based stabilizer, and any tin-based stabilizers that have a heat-stabilizing effect can be used. For example, mercapto tin-based heat stabilizers, such as dimethyltin mercapto, dimethyltin mercaptide, dibutyltin mercapto, dioctyltin mercapto, dioctyltin mercapto polymers, and dioctyltin mercapto acetate; maleate tin-based heat stabilizers, such as dimethyltin maleate, dibutyltin maleate, dioctyltin maleate and dioctyltin maleate polymers; and laurate tin-based heat stabilizers, such as dimethyltin laurate, dibutyltin laurate, and dioctyltin laurate; and the like can be used.

There is no particular limitation on the tin Ca—Zn-based stabilizer, and any Ca—Zn-based stabilizers that have a heat-stabilizing effect can be used. For example, zinc stearate, calcium stearate, zinc 12-hydroxystearate, calcium 12-hydroxystearate, and the like can be used.

There is no particular limitation on the β-diketone-based stabilizer, and any β-diketone-based stabilizers that have a heat-stabilizing effect can be used. For example, stearoyl benzoyl methane (SBM), dibenzoyl methane (DBM), and the like can be used.

The above-listed stabilizers may be used alone or in a combination of two or more.

From the viewpoint of suppressing coloration and securing transparency while improving melt-processability, it is preferable to use at least one selected from the group consisting of polyglycidyl methacrylate, tetrabromobisphenol A diglycidyl ether, hydrotalcite, zinc 12-hydroxystearate, calcium 12-hydroxystearate, stearoyl benzoyl methane (SBM), and dibenzoyl methane (DBM) as the stabilizer.

The thermoplastic acrylic resin composition contains the stabilizer in an amount of preferably 0.1 parts by mass or more and 30 parts by mass or less, more preferably 0.2 parts by mass or more and 20 parts by mass or less, and even more preferably 0.5 parts by mass or more and 10 parts by mass or less, with respect to 100 parts by mass of the acrylic resin. When the stabilizer is contained in an amount of 0.1 parts by mass or more, the effect of suppressing coloration is favorable. Moreover, when the stabilizer is contained in an amount of 30 parts by mass or less, in addition to that the effect of suppressing coloration is favorable, transparency can be secured, and degradation in dynamic properties of the acrylic resin molded body becomes negligible.

From the viewpoint of reducing heat generation caused by friction and shearing between the thermoplastic acrylic resin and a processing machine, and the viewpoint of improving fluidity and mold releasability, the thermoplastic acrylic resin composition may contain a lubricant as long as one or more embodiments of the present invention are not compromised. As the lubricant, for example, it is possible to use fatty acid ester-based lubricants, such as stearic acid monoglyceride and stearyl stearate; hydrocarbon-based lubricants, such as liquid paraffin, paraffin wax, and synthetic polyethylene wax; fatty acid-based lubricants, such as stearic acid; higher alcohol-based lubricants, such as stearyl alcohol; aliphatic amide-based lubricants, such as stearamide, oleamide, and erucamide; alkylene fatty acid amide-based lubricants, such as methylene bisstearamide and ethylene bisstearamide; metallic soap-based lubricants, such as lead stearate, zinc stearate, calcium stearate, and magnesium stearate; and the like. These lubricants may be used alone or in a combination of two or more. The amount of lubricant added can be set to be 10 parts by mass or less with respect to 100 parts by mass of the thermoplastic acrylic resin.

The thermoplastic acrylic resin composition may contain a processing aid, such as a modacrylic processing aid, as long as one or more embodiments of the present invention are not compromised. In the case where a fiber is made of the thermoplastic acrylic resin composition, from the viewpoint of improving spinnability, it is preferable that the thermoplastic acrylic resin composition contains a (meth)acrylate-based polymer and/or a styrene-acrylonitrile copolymer as the processing aid. As the (meth)acrylate-based polymer, a copolymer of (meth)acrylate with a copolymerization component, such as butyl (meth)acrylate, isobutyl (meth)acrylate, 2-ethylhexyl (meth)acrylate, styrene, vinyl acetate, or acrylonitrile, can be used. Moreover, as the (meth)acrylate-based polymer, a commercially available product, such as, for example, "Kane Ace PA20" and "Kane Ace PA101" manufactured by KANEKA Corporation, can be used. The amount of processing aid added can be set to be 10 parts by mass or less with respect to 100 parts by mass of the acrylic resin. In the present specification, the term "(meth)acrylate" means methacrylate and/or acrylate.

The thermoplastic acrylic resin composition can be used in a melted state, that is, it can be used as a melt. The melt can be obtained by melt-kneading the thermoplastic acrylic resin composition. There is no particular limitation on the melt-kneading method, and a common method for melt-kneading a thermoplastic resin composition can be used.

For the convenience of operation, the plasticizer for acrylic resin is first mixed with the thermoplastic acrylic resin in powder form to obtain a powder mixture. From the viewpoint of the ease of mixing, it is preferable that the thermoplastic acrylic resin powder has a moisture content of 2 mass % or less, and more preferably 0.5 mass % or less. Note that the moisture content of the thermoplastic acrylic resin can be measured using a heating and drying type moisture analyzer MX manufactured by A&D Company, Ltd. under conditions of 160° C. and 10 minutes. Preferably, the stabilizer is also mixed. Moreover, a lubricant, a processing aid, and the like may also be mixed as necessary. For the mixing, for example, a mixer such as a Henschel mixer, a super mixer, or a ribbon blender can be used. The conditions during the mixing operation, such as temperature and time, are not particularly limited as long as a powder mixture can be obtained From the viewpoint of easily obtaining a powder mixture and the viewpoint of allowing the various additives to be melt-adsorbed on the surface of the thermoplastic acrylic resin powder as necessary, it is preferable to set the temperature within a range of 0° C. or more and 120° C. or less, during the mixing operation, and perform cooling at the end of the mixing operation to a temperature below the glass transition temperature of the powder mixture by at least 10° C. so as to prevent the powder from fusing together or to equipment such as piping during its transfer.

Next, the powder mixture is melt-kneaded. The kneading temperature is at or above the glass transition temperature of a kneaded mixture of the thermoplastic acrylic resin and the plasticizer for acrylic resin, and from the viewpoint of suppressing coloration caused by thermal decomposition of the thermoplastic acrylic resin, the kneading temperature is preferably 40° C. or more and 200° C. or less, more preferably 80° C. or more and 185° C. or less, and even more preferably 100° C. or more and 165° C. or less. A kneading apparatus such as, for example, but not limited to, a single-screw extruder, a twin-screw extruder, or a plastomill, can be used for the kneading. A thermoplastic acrylic resin composition in strand form or pellet form can be obtained by melt-kneading the powder mixture.

A molded body can be obtained by processing the thermoplastic acrylic resin composition obtained above into a predetermined shape. There is no particular limitation on the molding method, and an extrusion molding method, an injection molding method, an insert molding method, a sandwich molding method, a foam molding method, a press molding method, a blow molding method, a calendar molding method, a rotational molding method, a slush molding method, a dip molding method, a cast molding method, and the like can be used. Examples of the molded body include a film, a plate, a fiber, an extrusion-molded body, and an injection-molded body. The molded body may be a foamed body and may be porous. In one or more embodiments of the present invention, the term "film" refers to one that is flexible and is in the form of a thin film with a thickness of not more than 200 μm, while the term "plate" refers to one that is not flexible and is in the form of a thin film or a plate with a thickness of more than 200 μm.

An acrylic fiber can be made of the thermoplastic acrylic resin composition. Specifically, an acrylic fiber can be obtained by melt-spinning the thermoplastic acrylic resin composition (e.g., melt-kneaded thermoplastic acrylic resin composition in pellet form). First, the thermoplastic acrylic resin composition is melt-spun into undrawn filaments in fiber form. Specifically, the melt-kneaded product (thermoplastic acrylic resin composition in pellet form) of the thermoplastic acrylic resin composition that has been melt-kneaded in an extruder, for example, a single-screw extruder, a counter-rotating twin-screw extruder, or a conical twin-screw extruder, is discharged from a spinning nozzle of the extruder, and passed through a heating cylinder to increase the temperature of the extruded thermoplastic acrylic resin composition to at least a temperature at which it can be taken up by a take-up wheel. Then, the extruded thermoplastic acrylic resin composition is taken up while being cooled to a temperature equal to or below its glass transition point by means of air cooling, forced-air cooling, or the like, and thus, undrawn filaments are formed. It is preferable to operate the extruder in a temperature range of, for example, 120° C. or more and 200° C. or less. There is no particular limitation on the ratio of the take-up speed to the discharge speed, but the take-up speed is preferably such a speed that this speed ratio is within a range of, for example, 1 or more and 100 or less. From the viewpoint of spinning stability, it is more preferable that the speed ratio is within a range of 5 or more and 50 or less. The hole diameter of the spinning nozzle is not particularly limited, but is, for example, preferably 0.05 mm or more and 2 mm or less, and more preferably 0.1 mm or more and 1 mm or less. It is preferable that extrusion is carried out with the nozzle temperature at or above a temperature that prevents melt fracture from occurring in the thermoplastic acrylic resin composition discharged from the spinning nozzle. The spinning nozzle temperature is preferably 160° C. or above, and more preferably 170° C. or above. The temperature of the heating cylinder is preferably 200° C. or above, and more preferably 230° C. or above. The cooling temperature in the case of air cooling is preferably −196° C. or more and 40° C. or less, and more preferably 0° C. or more and 30° C. or less, and the cooling temperature in the case of water cooling is preferably 5° C. or more and 60° C. or less, and more preferably 10° C. or more and 40° C. or less.

The undrawn filaments obtained above are subjected to a drawing treatment using a known method, and may be subjected to a thermal relaxation treatment as necessary. For example, if the acrylic fiber is to be used as artificial hair, it is preferable that the acrylic fiber is produced as a fiber having a single fiber fineness of 2 dtex or more and 100 dtex or less. Regarding the conditions for the drawing treatment, the drawing treatment is performed in a dry-heat atmosphere at a drawing treatment temperature of 70° C. or more and 150° C. or less, and the draw ratio is preferably about 1.1 times or more and 6 times or less, and more preferably about 1.5 times or more and 4.5 times or less. The thermal shrinkage can be reduced by subjecting the fiber after the drawing treatment to a thermal relaxation treatment, and preferably performing the thermal relaxation treatment of the fiber at a relaxation rate of 1% or more and 50% or less, and more preferably 5% or more and 40% or less. Moreover, it is also preferable to perform the thermal relaxation treatment in order to smooth any unevenness on the fiber surface and obtain a smooth tactile feel similar to that of human hair. Furthermore, the fineness of the fiber can also be controlled by washing the undrawn filaments or drawn filaments with water. In one or more embodiments of the present invention, the single fiber fineness is measured in accordance with JIS L 1013.

The acrylic fiber obtained above preferably has an apparent glass transition temperature of 60° C. or above, because, during overseas shipping, the temperature in a container on a ship may rise to as high as 60° C., and also from the viewpoint of preventing, for example, the fiber from fusing together during heating processing.

EXAMPLES

Hereinafter, the one or more embodiments of present invention will be described in greater detail using examples. Note that the present invention is not limited to the following examples.

First, measurement methods and evaluation methods will be described.

(1) The mass average molecular weight and the number average molecular weight were measured and calculated using a gel permeation chromatograph ("HLC-8320GPC" manufactured by Tosoh Corporation) in accordance with a GPC method.

(2) The average particle diameter was the particle diameter D50 at a cumulative percentage by volume of 50 vol % in a volume-based particle size distribution measured using a laser diffraction/scattering particle diameter distribution analyzer "Partica LA-950 V2" manufactured by HORIBA, Ltd.

(3) The glass transition temperature of an acrylic resin was obtained in the following manner using a differential scanning calorimeter "DSC-6100" manufactured by Seiko Instruments Inc.: The temperature of the acrylic resin was increased from −80° C. to 160° C. at 20° C./min and then reduced again to −80° C. at 20° C./min to remove the thermal history, the temperature was thereafter again increased from −80° C. to 160° C. at 10° C./min, and the value obtained at this time was determined as the glass transition temperature.

(4) Regarding GPC-MALS measurement, "HLC-8220GPC" manufactured by Tosoh Corporation was used with two TSKgel $GMH_{XL}$ columns, one TSKgel $G3000_{XL}$ column, and one TSKgel $G2000_{XL}$ column mounted therein, and DMF containing lithium bromide monohydrate in a concentration of 50 mM was used as an eluate. The value of the degree of branching gM (the degree of branching gM= (the square of the average radius of gyration of a branched polymer/the square of the average radius of gyration of a straight-chain polymer)) was calculated from average radii of gyration respectively obtained from the entire molecular weight distribution region using an acrylic resin composed of 50 mass % acrylonitrile and 50 mass % vinyl chloride and having a mass average molecular weight of 90000 and a number average molecular weight of 29000 as a standard linear polymer.

(5) The melt-processability was judged using the following criteria based on the results of transmitted light observation of a hot-pressed sample (resin plate) under an ultra-deep color 3D profile measuring microscope (VK-9500 manufactured by KEYENCE Corporation, with an objective magnification of 10×, a built-in lens magnification of 20×, and a total magnification of 200×).

Good: Only a total of less than 50 powder particles with a particle diameter of 10 μm or more were present in ten visual fields observed at a magnification of 200×.

Poor: A total of 50 or more powder particles with a particle diameter of 10 μm or more were present in ten visual fields observed at a magnification of 200×.

Failure: Kneading was not possible, and a hot-pressed sample to be observed was not prepared properly.

(6) The melt viscosity was obtained in the following manner: With use of a Capilograph (model "Capilograph 3B" manufactured by Toyo Seiki Seisaku-sho, Ltd.), 10 g of acrylic resin molded body (pellets) was introduced under conditions of a test speed of 10 mm/min, an orifice of 0.05 cm, a barrel radius of 0.4775 cm, a barrel temperature of 160° C., and a retention time of 60 seconds, and the melt viscosity was measured 120 seconds, 180 seconds, and 240 seconds after the extrusion, and an average of the three measured values was determined as the melt viscosity.

(7) The apparent glass transition temperature of an acrylic fiber means a peak temperature of tan δ. The peak temperature of tan δ is a temperature at which the dynamic viscoelasticity (tan δ) has its maximum value. The dynamic viscoelasticity (tan δ) was determined, in accordance with JIS K 7244, by measuring a loss modulus (E″) and a storage modulus (E′) of the fiber using a thermal analyzer and performing a calculation using the formula below:

Dynamic viscoelasticity (tan δ)=Loss modulus (E″)/Storage modulus (E′) A thermal analyzer (model "SSC/5200" manufactured by Seiko Instruments & Electronics Ltd.) was used. The loss modulus (E″) and the storage modulus (E′) of the fiber were measured in accordance with JIS K 7244 under the conditions of a frequency of 0.05 Hz, a load of 25±10 mN, and a temperature increase rate of 5° C./min. The dynamic viscoelasticity (tan δ) was calculated using the formula above. The temperature at which the dynamic viscoelasticity (tan δ) had its maximum value was determined as the peak temperature of tan δ (apparent glass transition temperature).

(8) The spinnability was evaluated in the following manner: When filaments were discharged from a circular spinning nozzle having 12 holes and taken up at a nozzle draft of 10 to 14, and the length of time for which filaments from all of the 12 holes were able to be taken up without breaking, or in other words, the length of time from when the filaments started to be taken up to when filament breakage occurred was measured. The measurement was performed three times, and the value of the product of the average time (spinning time) of the three measured values and the nozzle draft was evaluated.

Production Example 1

Into a 2-L separable flask with a reflux tube and a stirrer was added 554 g of CuBr, and the interior of the reaction vessel was purged with nitrogen. Then, 73.8 mL of acetonitrile was added, the separable flask was placed in an oil bath at 70° C., and the contents of the flask were stirred for 30 minutes. After that, 132 g of n-butyl acrylate, 7.2 mL of methyl 2-bromopropionate, and 4.69 mL of pentamethyldiethylenetriamine were added into the separable flask, and a reaction was initiated. N-butyl acrylate (528 g) was continuously added dropwise over a period of 90 minutes under heating and stirring at 70° C., followed by further heating and stirring at 70° C. for 80 minutes. The reaction mixture was diluted with toluene and passed through an activated alumina column, and then, volatiles were removed by distillation under reduced pressure. Thus, poly(n-butyl acrylate) having a Br group at one end was obtained.

800 mL of methanol was added into a flask and cooled to 0° C. t-Butoxy potassium (130 g) was added thereto in several batches. Then, while the flask was kept at 0° C., 200 mL of a solution of acrylic acid (100 g) in methanol (concentration: 0.5 g/mL) was added dropwise. After that, the temperature of the reaction liquid was returned from 0° C. to room temperature, and then, volatiles in the reaction liquid were removed by distillation under reduced pressure. Thus, potassium acrylate ($CH_2$=$CHCO_2K$) was obtained.

Into a 500-mL flask with a reflux tube were added 150 g of poly(n-butyl acrylate) having a Br group at one end obtained above, 7.45 g of potassium acrylate obtained above, and 150 mL of dimethyl acetamide, followed by heating and stirring at 70° C. for 3 hours. After that, dimethyl acetamide was removed by distillation from the reaction mixture. The reaction mixture was dissolved in toluene and passed through an activated alumina column, and then, toluene was removed by distillation. Thus, a poly(n-butyl acrylate) macromonomer having an acryloyl group at one end was obtained. The obtained poly(n-butyl acrylate) macromonomer having an acryloyl group at one end had a number average molecular weight of 12000 and a molecular weight distribution (mass average molecular weight/number average molecular weight) of 1.1.

Production Example 2

Poly(2-methoxyethyl acrylate) having an acryloyl group at one end was obtained in the same manner as in Production Example 1, except that 2-methoxyethyl acrylate was used instead of n-butyl acrylate, and the amount of methyl 2-bromopropionate was changed to 14.4 mL. The obtained poly(2-methoxyethyl acrylate) macromonomer having an acryloyl group at one end had a number average molecular weight of 6000 and a molecular weight distribution (mass average molecular weight/number average molecular weight) of 1.24.

Production Example 3

Poly(2-methoxyethyl acrylate/ethyl acrylate/n-butyl acrylate) having an acryloyl group at one end was obtained in the same manner as in Production Example 1, except that 2-methoxyethyl acrylate/ethyl acrylate/n-butyl acrylate (80/13/7 in terms of mass ratio) was used instead of n-butyl acrylate, and the amount of methyl 2-bromopropionate was changed to 14.4 mL. The obtained poly(2-methoxyethyl acrylate/ethyl acrylate/n-butyl acrylate) macromonomer having an acryloyl group at one end was composed of 80 mass % 2-methoxyethyl acrylate, 13 mass % ethyl acrylate, and 7 mass % n-butyl acrylate (excluding the acryloyl group at the end), and had a number average molecular weight of 6000 and a molecular weight distribution (mass average molecular weight/number average molecular weight) of 1.26.

Production of Acrylic Resins

Example 1

Into a polymerization reactor were added 50 parts by mass of vinyl chloride, 7.5 parts by mass of acrylonitrile, 5 parts by mass of poly(n-butyl acrylate) macromonomer having an acryloyl group at one end obtained in Production Example 1, 210 parts by mass of ion exchanged water, 0.25 parts by mass of partially saponified polyvinyl acetate (saponification degree: about 70 mol %, average polymerization degree: 1700), and 1.5 parts by mass of 1,1,3,3-tetramethylbutyl peroxyneodecanoate. Then, in a state in which the internal temperature of the polymerization reactor was cooled to 15° C. or below, the contents were stirred and dispersed for 15 minutes. After that, the internal temperature of the polymerization reactor was increased to 45° C. to initiate polymerization, and suspension polymerization was performed at a polymerization temperature of 47.5° C. for 4 hours, then at an increased polymerization temperature of 52.5° C. for 2 more hours, and subsequently at a further increased polymerization temperature of 55° C. for 2 more hours. During the polymerization, 37.5 parts by mass of acrylonitrile and 0.225 parts by mass of 2-mercaptoethanol were continuously added at a constant rate from immediately after the start of the polymerization to 7.25 hours after the start of the polymerization. After an unreacted monomer in the polymerization reactor was collected, a slurry was dispensed. The obtained slurry was dehydrated, and dried at 60° C. for 24 hours in a hot air dryer, to obtain an acrylic resin/poly(n-butyl acrylate) graft copolymer (thermoplastic acrylic resin). The obtained graft polymer was composed of 41.6 mass % acrylonitrile, 53.4 mass % vinyl chloride, and 5.0 mass % poly(n-butyl acrylate), and the conversion rate of the poly(n-butyl acrylate) macromonomer having an acryloyl group at one end was 92%. The obtained graft polymer had a mass average molecular weight of about 71000, a degree of branching gM of 0.424, an average particle diameter of its primary particles of 182.1 µm, and a glass transition temperature of 88.1° C.

Example 2

An acrylic resin/poly(2-methoxyethyl acrylate) graft copolymer (thermoplastic acrylic resin) was obtained in the same manner as in Example 1, except that the poly(2-methoxyethyl acrylate) macromonomer having an acryloyl group at one end obtained in Production Example 2 was used instead of the poly(n-butyl acrylate) macromonomer having an acryloyl group at one end obtained in Production Example 1, and the amount of 2-mercaptoethanol was changed to 0.25 parts by mass. The obtained graft polymer was composed of 43.8 mass % acrylonitrile, 51.2 mass % vinyl chloride, and 5.0 mass % poly(2-methoxyethyl acrylate), and the conversion rate of the poly(2-methoxyethyl acrylate) macromonomer having an acryloyl group at one end was 93%. The obtained graft polymer had a mass average molecular weight of about 70000, a degree of branching gM of 0.686, an average particle diameter of its primary particles of 169.5 µm, and a glass transition temperature of 85.6° C.

Example 3

An acrylic resin/poly(2-methoxyethyl acrylate/ethyl acrylate/n-butyl acrylate) graft copolymer (thermoplastic acrylic resin) was obtained in the same manner as in Example 1, except that the poly(2-methoxyethyl acrylate/ethyl acrylate/n-butyl acrylate) macromonomer having an acryloyl group at one end obtained in Production Example 3 was used instead of the poly(n-butyl acrylate) macromonomer having an acryloyl group at one end obtained in Production Example 1, and the amount of 2-mercaptoethanol was changed to 0.245 parts by mass. The obtained graft polymer was composed of 42.7 mass % acrylonitrile, 52.3 mass % vinyl chloride, and 5.0 mass % poly(2-methoxyethyl acrylate/ethyl acrylate/n-butyl acrylate), and the conversion rate of the poly(2-methoxyethyl acrylate/ethyl acrylate/n-butyl acrylate) macromonomer having an acryloyl group at one end was 95%. The obtained graft polymer had a mass average molecular weight of about 70000, a degree of branching gM of 0.739, an average particle diameter of its primary particles of 177.1 µm, and a glass transition temperature of 85.5° C.

Comparative Example 1

An acrylic resin that was not copolymerized with a macromonomer was obtained in the same manner as in Example 1, except that the poly(n-butyl acrylate) macromonomer having an acryloyl group at one end was not added, but 52 parts by mass of vinyl chloride and 9 parts by mass of acrylonitrile were added, and 39 parts by mass of acrylonitrile and 0.225 parts by mass of 2-mercaptoethanol were continuously added from immediately after the start of the polymerization to 7.25 hours after the start of the polymerization. The obtained acrylic resin was composed of 48.9 mass % acrylonitrile and 51.1 mass % vinyl chloride, had a mass average molecular weight of about 72000, an average particle diameter of its primary particles of 143.4 µm, and a glass transition temperature of 86.5° C.

Comparative Example 2

An acrylic resin that was not copolymerized with a macromonomer was obtained in the same manner as in Comparative Example 1, except that the amount of 2-mercaptoethanol was changed to 0.1 parts by mass. The obtained acrylic resin was composed of 49.0 mass % acrylonitrile and 51.0 mass % vinyl chloride, and had a mass average molecular weight of about 92000, an average particle diameter of its primary particles of 179.3 µm, and a glass transition temperature of 85.6° C.

Comparative Example 3

Into a polymerization reactor were added 46 parts by mass of vinyl chloride, 3.3 parts by mass of acrylonitrile, 10 parts by mass of n-butyl acrylate, 210 parts by mass of ion exchanged water, 0.02 parts by mass of ammonium persulfate, 0.64 parts by mass of sodium hydrogen sulfite, 0.006 parts by mass of ferrous sulfate, 0.3 parts by mass of sulfuric acid (64 mass %), and 0.87 parts by mass of sodium lauryl sulfate. The pH in the polymerization reactor was adjusted to 2 to 3, and emulsion polymerization was performed at a polymerization temperature of 50° C. for a polymerization time of 5 hours, to obtain an acrylic resin latex. During the polymerization, 0.5 parts by mass of sodium styrenesulfonate was continuously added at a constant rate from 1.5 hours after the start of the polymerization to 5 hours after the start of the polymerization, and 40.2 parts by mass of acrylonitrile was continuously added at a constant rate from immediately after the start of the polymerization to 4.75 hours after the start of the polymerization. Moreover, 10 parts by mass of n-butyl acrylate was also continuously added at a constant rate from immediately after the start of the polymerization to 4.75 hours after the start of the polymerization. Furthermore, in order to keep a constant polymerization rate, 0.262 parts by mass of ammonium persulfate used was continuously added at a constant rate from immediately after the start of the polymerization to 5 hours after the start of the polymerization. After that, the obtained acrylic resin latex was subjected to salting-out, dehydration, water washing, and drying, to obtain an acrylic resin. The obtained acrylic resin was composed of 41.6 mass % acrylonitrile, 48.1 mass % vinyl chloride, 9.8 mass % n-butyl acrylate, and 0.5 mass % sodium styrenesulfonate, and had a mass average molecular weight of about 80000, an average particle diameter of its primary particles of 59.6 nm, and a glass transition temperature of 72.1° C.

Comparative Example 4

Into a polymerization reactor were added 52.5 parts by mass of vinyl chloride, 5 parts by mass of acrylonitrile, 210 parts by mass of ion exchanged water, 0.02 parts by mass of ammonium persulfate, 0.59 parts by mass of sodium hydrogen sulfite, 0.0012 parts by mass of ferrous sulfate, 0.3 parts by mass of sulfuric acid (64 mass %), and 0.87 parts by mass of sodium lauryl sulfate. The pH in the polymerization reactor was adjusted to 2 to 3, and emulsion polymerization was performed at a polymerization temperature of 50° C. for a polymerization time of 5 hours, to obtain an acrylic resin latex. During the polymerization, 0.5 parts by mass of sodium styrenesulfonate was continuously added at a constant rate from 2 hours after the start of the polymerization to 5 hours after the start of the polymerization, and 42 parts by mass of acrylonitrile was continuously added at a constant rate from immediately after the start of the polymerization to 4.75 hours after the start of the polymerization. Furthermore, in order to keep a constant polymerization rate, 0.262 parts by mass of ammonium persulfate used was continuously added at a constant rate from immediately after the start of the polymerization to 5 hours after the start of the polymerization. After that, the obtained acrylic resin latex was subjected to salting-out, dehydration, water washing, and drying, to obtain an acrylic resin. The obtained acrylic resin was composed of 49.0 mass % acrylonitrile, 50.5 mass % vinyl chloride, and 0.5 mass % sodium styrenesulfonate, and had a mass average molecular weight of about 90000, an average particle diameter of its primary particles of 60.7 nm, and a glass transition temperature of 91.3° C.

Table 1 below collectively shows the macromonomer content, the mass average molecular weight, the degree of branching (gM), the average particle diameter (µm) of primary particles, and the glass transition temperature (° C.) of the thermoplastic acrylic resins of Examples 1 to 3 and the acrylic resins of Comparative Examples 1 to 4.

Production of Plates

Example A1

To 100 parts by mass of the thermoplastic acrylic resin (graft copolymer) obtained in Example 1 were added 12.5 parts by mass of dimethyl sulfone as a plasticizer, 7.5 parts by mass of tetrabromobisphenol A diglycidyl ether (product name "SR-BSP" manufactured by Sakamoto Kagaku Yakuhin) and 1.5 parts by mass of hydrotalcite (product name "ALCAMIZER (registered trademark) 1" manufactured by Kyowa Chemical Industry Co., Ltd.) as stabilizers, 0.15 parts by mass of fatty acid ester-based lubricant (product name "EW-100" manufactured by Riken Vitamin Co., Ltd.) as a lubricant, as well as 0.2 parts by mass of (meth)acrylate-based polymer (product name "Kane Ace PA20" manufactured by KANEKA Corporation), 0.3 parts by mass of calcium soap-zinc soap, 0.4 parts by mass of β-diketone, and 0.2 parts by mass of stearic acid (product name "stearic acid Sakura" manufactured by NOF Corporation) as other additives. The materials were mixed using a mixer to obtain a powder mixture. Then, 62 g of the powder mixture was kneaded using a LABO PLASTOMILL (model "4C150" manufactured by Toyo Seiki Seisaku-sho, Ltd.) under the conditions of 145° C., 50 rpm, and 4.5 minutes.

A portion weighing about 5 g was cut from the obtained melt-kneaded product. An aluminum block (80×60×40 mm), an aluminum plate (80×60×1 mm), a spacer aluminum plate (U-shaped, thickness: 1 mm), and an aluminum plate (80×60×1 mm) were stacked on a lower heater of a Hand Hot Press Digital HHP-2D (AS ONE Corporation) in this order from the bottom and preheated for 30 minutes under the conditions of 160° C. in a state of being pressed down by an upper heater. After that, the cut portion of the melt-kneaded product was placed under the uppermost aluminum plate (80×60×1 mm), and hand pressed for 60 seconds with the aluminum plate (80×60×1 mm) placed on top of it. The aluminum plate (80×60×1 mm), the spacer aluminum plate (U-shaped, thickness: 1 mm), and the aluminum plate (80×60×1 mm) were taken out together and sandwiched between upper and lower stainless steel (SUS) plates (300×300×1 mm), and cooled for 10 minutes with a 2-kg weight placed on top of the upper SUS plate. After the cooling operation, the aluminum jigs were removed, and thus, an acrylic resin plate with a thickness of 1 mm was obtained.

Example A2

An acrylic resin plate was produced in the same manner as in Example A1, except that the thermoplastic acrylic resin obtained in Example 2 was used instead of the thermoplastic acrylic resin obtained in Example 1, and the amount of dimethyl sulfone was changed to 10 parts by mass.

Example A3

An acrylic resin plate was produced in the same manner as in Example A1, except that the thermoplastic acrylic resin obtained in Example 3 was used instead of the thermoplastic acrylic resin obtained in Example 1, and the amount of dimethyl sulfone was changed to 10 parts by mass.

Comparative Example A1

An attempt was made to produce a melt-molded product in the same manner as in Example A1, except that the acrylic resin obtained in Comparative Example 1 was used, and the amount of dimethyl sulfone was changed to 15 parts by mass. However, the powder mixture was not sufficiently kneaded, and an aggregate of powder containing no melt-kneaded region was obtained.

Comparative Example A2

An attempt was made to produce a melt-molded product in the same manner as in Example A1, except that the acrylic resin obtained in Comparative Example 1 was used, and the amount of dimethyl sulfone was changed to 20 parts by mass. However, the powder mixture was not sufficiently kneaded, and an aggregate of powder containing no melt-kneaded region was obtained.

Comparative Example A3

An acrylic resin plate was produced in the same manner as in Example A1, except that the acrylic resin obtained in Comparative Example 2 was used, and the amount of dimethyl sulfone was changed to 20 parts by mass.

Comparative Example A4

A plate was produced in the same manner as in Example A1, except that the acrylic resin obtained in Comparative Example 3 was used, and the amount of dimethyl sulfone was changed to 10 parts by mass. As a result, a melt-kneaded product that was partially kneaded was obtained, but an odor was generated during the kneading.

Comparative Example A5

An acrylic resin plate was produced in the same manner as in Example A1, except that the acrylic resin obtained in Comparative Example 4 was used, and the amount of dimethyl sulfone was changed to 25 parts by mass.

Comparative Example A6

An acrylic resin plate was produced in the same manner as in Example A1, except that the acrylic resin obtained in Comparative Example 4 was used, and the amount of dimethyl sulfone was changed to 10 parts by mass.

The melt-kneadability of the acrylic resin plates of Examples A1 to A3 and Comparative Examples A1 to A6 was evaluated in the above-described manner. Table 2 below shows the results.

Production of Fibers

Example B1

Production of Acrylic Resin Composition Pellets

To 100 parts by mass of the acrylic resin obtained in Example 1 were added 12.5 parts by mass of dimethyl sulfone as a plasticizer, 7.5 parts by mass of tetrabromobisphenol A diglycidyl ether (product name "SR-BSP" manufactured by Sakamoto Kagaku Yakuhin) and 1.5 parts by mass of hydrotalcite (product name "ALCAMIZER (registered trademark) 1" manufactured by Kyowa Chemical Industry Co., Ltd.) as stabilizers, 0.15 parts by mass of fatty acid ester-based lubricant (product name "EW-100" manufactured by Riken Vitamin Corporation) as a lubricant, as well as 0.2 parts by mass of (meth)acrylate-based polymer (product name "Kane Ace PA20" manufactured by KANEKA Corporation), 0.3 parts by mass of calcium soap-zinc soap, 0.4 parts by mass of β-diketone, and 0.2 parts by mass of stearic acid (product name "stearic acid Sakura" manufactured by NOF Corporation) as other additives. While the materials were mixed using a Henschel mixer, the temperature was increased to 110° C., and then cooled to 50° C. Thus, a powder mixture was obtained. Then, the powder mixture was extruded using a laboratory extruder (model "4C150" manufactured by Toyo Seiki Seisaku-sho, Ltd.: a combination of a 20-mm extrusion unit and a 2-mm strand nozzle) to obtain a strand. The extruder was operated in a temperature range of 110 to 150° C. The obtained strand was air-cooled, and then pelletized. The obtained pellets had a melt viscosity of 1646 Pa·s.

Melt-Spinning of Acrylic Fiber

The acrylic resin composition pellets obtained above were melt-spun by extrusion using a laboratory extruder (model "4C150" manufactured by Toyo Seiki Seisaku-sho, Ltd.: a combination of a 20-mm extrusion unit, a downward die for melt viscosity measurement, and a circular spinning nozzle having 12 holes with a hole cross-sectional area of 0.16 mm$^2$) at a cylinder temperature of 120 to 170° C. and a nozzle temperature within a range of 210±20° C. The extruded filaments were taken up at a nozzle draft of about 10, to obtain undrawn filaments with a fineness of 160 dtex. The obtained undrawn filaments were dry-heat drawn to a draw ratio of 1.6 in a dry heat atmosphere at 100° C., and thus, an acrylic fiber with a single fiber fineness of about 100 dtex was obtained.

Example B2

Production of Acrylic Resin Composition Pellets

Acrylic resin composition pellets were obtained in the same manner as in Example B1, except that the acrylic resin obtained in Example 2 was used, and the amount of dimethyl sulfone was changed to 10 parts by mass. The obtained pellets had a melt viscosity of 1026 Pa·s.

Melt-Spinning of Acrylic Fiber

Melt-spinning was performed in the same manner as in Example B1, except that the acrylic resin composition pellets obtained above were used. The extruded filaments were taken up at a nozzle draft of about 11, to obtain undrawn filaments with a fineness of 150 dtex. The obtained undrawn filaments were dry-heat drawn to a draw ratio of 2.3 in a dry heat atmosphere at 100° C., and thus, an acrylic fiber with a single fiber fineness of about 65 dtex was obtained.

Example B3

Production of Acrylic Resin Composition Pellets

Acrylic resin composition pellets were obtained in the same manner as in Example B1, except that the acrylic resin obtained in Example 3 was used, and the amount of dimethyl sulfone was changed to 10 parts by mass. The obtained pellets had a melt viscosity of 1108 Pa·s.

Melt-Spinning of Acrylic Fiber

Melt-spinning was performed in the same manner as in Example B1, except that the acrylic resin composition pellets obtained above were used. The extruded filaments were taken up at a nozzle draft of about 11, to obtain undrawn filaments with a fineness of 150 dtex. The obtained undrawn filaments were dry-heat drawn to a draw ratio of 2.1 in a dry heat atmosphere at 100° C., and thus, an acrylic fiber with a single fiber fineness of about 71 dtex was obtained.

Comparative Example B1

Production of Acrylic Resin Composition Pellets

Acrylic resin composition pellets were obtained in the same manner as in Example B1, except that the acrylic resin obtained in Comparative Example 1 was used, and the amount of dimethyl sulfone was changed to 15 parts by mass. The obtained pellets had a melt viscosity of 1669 Pa·s.

Melt-Spinning of Acrylic Fiber

Melt-spinning was performed in the same manner as in Example B1, except that the acrylic resin composition pellets obtained above were used. The nozzle draft could be increased only to about 6, and undrawn filaments were not obtained.

Comparative Example B2

Production of Acrylic Resin Composition Pellets

Acrylic resin composition pellets were obtained in the same manner as in Example B1, except that the acrylic resin obtained in Comparative Example 2 was used, and the amount of dimethyl sulfone was changed to 20 parts by mass. The obtained pellets had a melt viscosity of 1284 Pa·s.

Melt-Spinning of Acrylic Fiber

Melt-spinning was performed in the same manner as in Example B1, except that the acrylic resin composition pellets obtained above were used. The extruded filaments were taken up at a nozzle draft of about 13.5, to obtain undrawn filaments with a fineness of 120 dtex. The obtained undrawn filaments were dry-heat drawn to a draw ratio of 1.5 in a dry heat atmosphere at 100° C., and thus, an acrylic fiber with a single fiber fineness of about 76 dtex was obtained.

Comparative Example B3

Production of Acrylic resin Composition Pellets

Acrylic resin composition pellets were obtained in the same manner as in Example B1, except that the acrylic resin obtained in Comparative Example 4 was used, and the amount of dimethyl sulfone was changed to 25 parts by mass. The obtained pellets had a melt viscosity of 1342 Pa·s.

Melt-Spinning of Acrylic Fiber

Melt-spinning was performed in the same manner as in Example B1, except that the acrylic resin composition pellets obtained above were used. The extruded filaments were taken up at a nozzle draft of about 11, to obtain undrawn filaments with a fineness of 150 dtex. The obtained undrawn filaments were dry-heat drawn to a draw ratio of 1.5 in a dry heat atmosphere at 100° C., and thus, an acrylic fiber with a single fiber fineness of about 100 dtex was obtained.

The apparent glass transition temperature (apparent Tg) and the spinnability of the acrylic fibers obtained in Examples B1 to B3 and Comparative Examples B2 and B3 were measured in the above-described manners. Table 3 below shows the results.

TABLE 1

| | Macromonomer | | | Degree of branching (gM) | Average particle diameter of primary particles | Glass transition temperature (° C.) |
|---|---|---|---|---|---|---|
| | Type | Content (mass %) | Mass average molecular weight | | | |
| Example 1 | Production Example 1 | 5 | 71000 | 0.424 | 182.1 μm | 88.1 |
| Example 2 | Production Example 2 | 5 | 70000 | 0.686 | 169.5 μm | 85.6 |
| Example 3 | Production Example 3 | 5 | 70000 | 0.739 | 177.1 μm | 85.5 |
| Comparative Example 1 | — | 0 | 72000 | 1 | 143.4 μm | 86.5 |
| Comparative Example 2 | — | 0 | 92000 | 1 | 179.3 μm | 85.6 |
| Comparative Example 3 | — | 9.8* | 80000 | 1 | 59.6 nm | 72.1 |
| Comparative Example 4 | — | 0 | 90000 | 1 | 60.7 nm | 91.3 |

*In Comparative Example 3, the content means the amount of n-butyl acrylate.

TABLE 2

| | Acrylic resin | | Amount of plasticizer | |
|---|---|---|---|---|
| | Type | Amount added (parts by mass) | added (parts by mass) | Melt-kneadability |
| Example A1 | Example 1 | 100 | 12.5 | Good |
| Example A2 | Example 2 | 100 | 10 | Good |
| Example A3 | Example 3 | 100 | 10 | Good |

TABLE 2-continued

|  | Acrylic resin | | Amount of plasticizer | |
|---|---|---|---|---|
|  | Type | Amount added (parts by mass) | added (parts by mass) | Melt-kneadability |
| Comparative Example A1 | Comparative Example 1 | 100 | 15 | Failure |
| Comparative Example A2 | Comparative Example 1 | 100 | 20 | Failure |
| Comparative Example A3 | Comparative Example 2 | 100 | 20 | Good |
| Comparative Example A4 | Comparative Example 3 | 100 | 10 | Poor |
| Comparative Example A5 | Comparative Example 4 | 100 | 25 | Good |
| Comparative Example A6 | Comparative Example 4 | 100 | 10 | Poor |

TABLE 3

|  | Acrylic resin | | Amount of plasticizer | Melt | Single fiber | Apparent | Spinning | |
|---|---|---|---|---|---|---|---|---|
|  | Type | Amount added | added (parts by mass) | viscosity (Pa · s) | fineness (dtex) | Tg (° C.) | time (sec) | Spinnability |
| Example B1 | Example 1 | 100 | 12.5 | 1646 | 103.5 | 62.1 | 45 | 445.5 |
| Example B2 | Example 2 | 100 | 10 | 1026 | 65.2 | 63.8 | 180 | 1926 |
| Example B3 | Example 3 | 100 | 10 | 1108 | 71.2 | 66.9 | 300 | 3210 |
| Comparative Example B2 | Comparative Example 2 | 100 | 20 | 1284 | 75.5 | 51.2 | 120 | 1632 |
| Comparative Example B3 | Comparative Example 4 | 100 | 25 | 1342 | 102.2 | 46.8 | 10 | 99 |

As is clear from Table 1 above, in each of Examples 1 to 4, in which the acrylic resins were produced using the suspension polymerization method, 90 mass % or more of the macromonomer used as the raw material was copolymerized with acrylonitrile and vinyl chloride. Therefore, it was found that, when compared with an emulsion polymerization method, which is commonly used for production of acrylic resins, acrylonitrile and vinyl chloride can be copolymerized with a macromonomer with a better yield using the suspension polymerization method.

As is clear from the results shown in Table 2 above, the thermoplastic acrylic resins of Examples 1 to 4, which were obtained by graft copolymerization of the macromonomers, had improved melt-processing properties compared with the acrylic resins of Comparative Examples 1 to 4, which were not copolymerized with a macromonomer. Moreover, as is clear from Table 1 above, the thermoplastic acrylic resins of Examples 1 to 4, which were obtained by graft copolymerization of the macromonomers, had improved heat resistance compared with the acrylic resin of Comparative Example 3, which was obtained by copolymerizing n-butyl acrylate, which is a monomer capable of reducing the glass transition temperature of a vinyl-based polymer, with acrylonitrile and vinyl chloride.

From the results shown in Table 3 above, when the acrylic fiber of Example B1, which was obtained by melt-spinning the thermoplastic acrylic resin composition (in pellet form) containing the thermoplastic acrylic resin of Example 1, which was obtained by graft copolymerization of the macromonomer, was compared with the acrylic fiber of Comparative Example B2 or B3, in which the acrylic resin that was not copolymerized with a macromonomer was used, it was confirmed that the acrylic fiber of Example B1 had improved heat resistance, because it was able to be melt-spun even with a reduced amount of plasticizer added and had an improved apparent glass transition temperature.

From the results shown in Table 3 above, the thermoplastic acrylic resin compositions (in pellet form) respectively containing the thermoplastic acrylic resins of Examples 2 and 3, which were obtained by copolymerizing the macromonomers containing an acrylic ester monomer having a heteroatom in the ester moiety in an amount of 50 mass % or more, had lower melt viscosities than the thermoplastic acrylic resin composition (in pellet form) containing the thermoplastic acrylic resin of Example 1, which was obtained by copolymerizing the macromonomer made of a monomer whose ester moiety was composed only of hydrocarbon, and were therefore confirmed to have excellent melt-processability.

As is clear from the results shown in Table 3 above, in Examples B2 and B3, in which the thermoplastic acrylic resin compositions (in pellet form) respectively containing the thermoplastic acrylic resins obtained by copolymerizing the macromonomers containing an acrylic ester monomer having a heteroatom in the ester moiety in an amount of 50 mass % or more were used, it was possible to perform melt-spinning for a longer spinning time than in Example B1, in which the thermoplastic acrylic resin composition (in pellet form) containing the thermoplastic acrylic resin obtained by copolymerizing the macromonomer made of a monomer whose ester moiety was composed only of hydrocarbon was used.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A thermoplastic acrylic resin composition comprising:
   a thermoplastic acrylic resin that is a graft copolymer,
   in which a stem polymer is an acrylic resin containing acrylonitrile and another ethylenically unsaturated monomer, and
   a branch polymer is a polymer composed of an ethylenically unsaturated monomer;
   a plasticizer; and
   a stabilizer,
   wherein the thermoplastic acrylic resin contains acrylonitrile in an amount of 35 mass % or more and 84.5 mass % or less;
   the another ethylenically unsaturated monomer in an amount of 15 mass % or more and 64.5 mass % or less; and the branch polymer composed of the ethylenically unsaturated monomer in an around of 0.5 mass % or more and 40 mass %, or less,
wherein the plasticizer is an organic compound that is compatible with the thermoplastic acrylic resin and has a boiling point of 200° C. or above, and
wherein the stabilizer is at least one selected from the group consisting of polyglycidyl methacrylate, tetrabromobisphenol A diglycidyl ether, hydrotalcite, zinc 12-hydroxystearate, calcium 12-hydroxystearate, stearoyl benzoyl methane (SBM), and dibenzoyl methane (DBM).

2. The thermoplastic acrylic resin composition according to claim 1,
wherein the thermoplastic acrylic resin is a copolymer obtained by polymerizing the acrylonitrile, the another ethylenically unsaturated monomer, and a macromonomer having, as its main chain, the branch polymer composed of the ethylenically unsaturated monomer, wherein the ethylenically unsaturated monomer contains a double bond, and
when a total mass of the acrylonitrile, the another ethylenically unsaturated monomer, and the macromonomer having a polymer composed of the ethylenically unsaturated monomer containing the double bond as the main chain is taken as 100 parts by mass,
the acrylonitrile is contained in an amount of 35 parts by mass or more and 84.5 parts by mass or less,
the another ethylenically unsaturated monomer is contained in an amount of 15 parts by mass or more and 64.5 parts by mass or less, and
the macromonomer having the branch polymer composed of the ethylenically unsaturated monomer containing the double bond as the main chain is contained in an amount of 0.5 parts by mass or more and 40 parts by mass or less.

3. The thermoplastic acrylic resin composition according to claim 1,
wherein the another ethylenically unsaturated monomer is one or more ethylenically unsaturated monomers selected from the group consisting of a vinyl halide and a vinylidene halide.

4. The thermoplastic acrylic resin composition according to claim 1,
wherein the thermoplastic acrylic resin contains the branch polymer composed of the ethylenically unsaturated monomer in an amount of 1 mass % or more and 30 mass % or less.

5. The thermoplastic acrylic resin composition according to claim 1,
wherein primary particles of the thermoplastic acrylic resin have an average particle diameter of 10 μm or more and 1000 μm or less.

6. The thermoplastic acrylic resin composition according to claim 2,
wherein the macromonomer having the branch polymer composed of the ethylenically unsaturated monomer containing the double bond as the main chain has at least one reactive functional group per single molecule at an end of the single molecule, the reactive functional group having a polymerizable carbon-carbon double bond represented by a general formula (1) below:

$$CH_2=C(R)-C(O)O- \quad (1)$$

where R represents hydrogen or an organic group having 1 to 20 carbon atoms.

7. The thermoplastic acrylic resin composition according to claim 1,
wherein the branch polymer composed of the ethylenically unsaturated monomer contains one or more monomers selected from the group consisting of a (meth)acrylic ester-based monomer, a styrene-based monomer, a nitrile group-containing vinyl monomer, and an amide group-containing vinyl monomer.

8. The thermoplastic acrylic resin composition according to claim 1,
wherein the branch polymer composed of the ethylenically unsaturated monomer contains a (meth)acrylic ester monomer in an amount of 50 mass % or more, the (meth)acrylic ester monomer having a heteroatom in its ester moiety.

9. The thermoplastic acrylic resin composition according to claim 1,
wherein the plasticizer is contained in an amount of 0.1 parts by mass or more and 50 parts by mass or less, with respect to 100 parts by mass of the thermoplastic acrylic resin.

10. The thermoplastic acrylic resin composition according to claim 1,
wherein the plasticizer is at least one selected from the group consisting of dimethyl sulfone, diethyl sulfone, dipropyl sulfone, dibutyl sulfone, diphenyl sulfone, vinyl sulfone, ethyl methyl sulfone, methyl phenyl sulfone, methyl vinyl sulfone, 3-methyl sulfolane, dipropyl sulfoxide, tetramethylene sulfoxide, diisopropyl sulfoxide, methyl phenyl sulfoxide, dibutyl sulfoxide, diisobutyl sulfoxide, di-p-tolyl sulfoxide, diphenyl sulfoxide, benzyl sulfoxide, lactide, pyrrolidone, N-methyl pyrrolidone, ε-caprolactam, N-methylcaprolactam, γ-butyrolactone, γ-hexalactone, γ-heptalactone, γ-octalactone, ε-caprolactone, and ε-octalactone.

11. The thermoplastic acrylic resin composition according to claim 1,
wherein the plasticizer is at least one selected from the group consisting of dimethyl sulfone and lactide.

12. The thermoplastic acrylic resin composition according to claim 1,
wherein the stabilizer is contained in an amount of 0.1 parts by mass or more and 30 parts by mass or less, with respect to 100 parts by mass of the thermoplastic acrylic resin.

13. An acrylic fiber made of the thermoplastic acrylic resin composition according to claim 1.

14. The acrylic fiber according to claim 13,
wherein the thermoplastic acrylic resin forming the acrylic fiber is a copolymer obtained by polymerizing acrylonitrile, another ethylenically unsaturated monomer, and a macromonomer having, as its main chain, the branch polymer composed of the ethylenically unsaturated monomer containing the double bond, and
when a total mass of the acrylonitrile, the other ethylenically unsaturated monomer, and the macromonomer having the branch polymer composed of the ethylenically unsaturated monomer containing the double bond as the main chain is taken as 100 parts by mass,
the acrylonitrile is contained in an amount of 35 parts by mass or more and 84.5 parts by mass or less,
the another ethylenically unsaturated monomer is contained in an amount of 15 parts by mass or more and 64.5 parts by mass or less, and
the macromonomer having the branch polymer composed of the ethylenically unsaturated monomer containing the double bond as the main chain is contained in an amount of 0.5 parts by mass or more and 40 parts by mass or less.

* * * * *